(12) United States Patent
Vilar

(10) Patent No.: US 7,328,728 B1
(45) Date of Patent: Feb. 12, 2008

(54) MOBILE EMERGENCY RESPONSE FUEL FACILITY

(76) Inventor: David S Vilar, 4200 Lema Dr., Spring Hill, FL (US) 34609

( * ) Notice: Subject to any disclaimer, the term of this patent is extended or adjusted under 35 U.S.C. 154(b) by 0 days.

(21) Appl. No.: 11/324,946

(22) Filed: Jan. 4, 2006

(51) Int. Cl.
B65B 1/04 (2006.01)

(52) U.S. Cl. .................. 141/231; 141/94; 137/565.17; 222/129

(58) Field of Classification Search .................. 141/18, 141/94, 231; 137/551, 565.01, 565.17; 222/108, 222/129, 131
See application file for complete search history.

(56) References Cited

U.S. PATENT DOCUMENTS

| 6,176,279 | B1 * | 1/2001 | Dahlin et al. ................ 141/231 |
| 6,182,710 | B1 * | 2/2001 | Webb ............................ 141/1 |
| 6,732,769 | B2 * | 5/2004 | Del Campo .................. 141/97 |
| 6,755,225 | B1 * | 6/2004 | Niedwiecki et al. ......... 141/231 |
| 6,786,245 | B1 * | 9/2004 | Eichelberger et al. ......... 141/4 |
| 6,886,609 | B2 * | 5/2005 | Cohen et al. ................ 141/231 |
| 7,093,626 | B2 * | 8/2006 | Li et al. ...................... 141/231 |
| 7,156,134 | B1 * | 1/2007 | Brakefield et al. .......... 141/231 |

* cited by examiner

Primary Examiner—Timothy L. Maust
(74) Attorney, Agent, or Firm—Edward P Dutkiewicz

(57) ABSTRACT

A planar support has an upper and lower surface, a front end and a rear end. The support has wheels. A housing mounted on the upper surface has a rear wall, front wall and side walls and a roof to define a space. A wall divides the space into a first chamber and a second chamber. A gasoline fuel tank and a diesel fuel tank is provided in the second chamber. A pump dispenses gasoline and diesel fuel from the tanks.

7 Claims, 3 Drawing Sheets

MOBILE EMERGENCY RESPONSE FUEL FACILITY

BACKGROUND OF THE INVENTION

1. Field of the Invention

The present invention relates to a mobile emergency response fuel facility and more particularly pertains to providing fuel to people and their vehicles in regions hit by hurricanes and other disasters.

2. Description of the Prior Art

The use of fuel facilities of known designs and configurations is known in the prior art. More specifically, fuel facilities of known designs and configurations previously devised and utilized for the purpose of providing fuel through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,988,020 issued Jan. 29, 1991 to Webb relates to a Portable Fueling Facility. U.S. Pat. No. 5,135,258 issued Aug. 4, 1992 to Buxton relates to a Trailer with Fuel Tanks and Means for Pumping Fuel. Lastly, U.S. Pat. No. 5,624,137 issued Apr. 29, 1997 to Lesesne relates to a Towable Auxiliary Fuel Tank.

While these devices fulfill their respective, particular objectives and requirements, the aforementioned patents do not describe a mobile emergency response fuel facility that allows providing fuel to people and their vehicles in regions hit by hurricanes and other disasters.

In this respect, the mobile emergency response fuel facility according to the present invention substantially departs from the conventional concepts and designs of the prior art, and in doing so provides an apparatus primarily developed for the purpose of providing fuel to people and their vehicles in regions hit by hurricanes and other disasters.

Therefore, it can be appreciated that there exists a continuing need for a new and improved mobile emergency response fuel facility which can be used for providing fuel to people and their vehicles in regions hit by hurricanes and other disasters. In this regard, the present invention substantially fulfills this need.

SUMMARY OF THE INVENTION

In view of the foregoing disadvantages inherent in the known types of fuel facilities of known designs and configurations now present in the prior art, the present invention provides an improved mobile emergency response fuel facility. As such, the general purpose of the present invention, which will be described subsequently in greater detail, is to provide a new and improved mobile emergency response fuel facility and method which has all the advantages of the prior art and none of the disadvantages.

To attain this, the present invention essentially comprises a mobile emergency response fuel facility. First provided is a planar support. The support has an upper surface and a lower surface. The support has a front end and a rear end. The support has a plurality of wheels. The wheels depend from the lower surface adjacent to the rear end. The wheels have an attachment component. The attachment component is adjacent to the front end. In this manner the wheels may be separably coupled to a towing vehicle for transportation purposes.

A rectilinear housing is provided. The housing is mounted on the upper surface of the planar support. The housing has a vertical rear wall. The rear wall overlies the rear end. The housing has a vertical front wall. The front wall is in proximity to the front end. The housing has vertical side walls. The side walls are provided between the front and rear walls. The housing has a horizontal roof. The roof overlies the front and rear and side walls. In this manner a space is defined there beneath.

Provided next is a vertical intermediate wall. The intermediate wall is parallel with the front and rear walls. In this manner the space is divided into a smaller forward chamber for controller components and a larger rearward chamber for the storage of fuel to be dispensed.

A rectilineal gasoline fuel tank is provided. The gasoline fuel tank is provided in the rearward chamber for gasoline. A cylindrical tank is provided for diesel fuel. A gasoline vent is provided. The gasoline vent extends upwardly from the gasoline fuel tank through the roof and vents to atmosphere. A diesel fuel vent is provided. The diesel vent extends upwardly from the gasoline fuel tank through the roof and vents to atmosphere. Recesses are provided in the gasoline fuel tank. Positioning blocks are provided. The blocks extend upwardly from the upper surface into the recesses. In this manner undesired movement of the gasoline fuel tank during transportation is precluded.

Provided next is a plurality of pumps. The pumps include two rearward pumps. The rearward pumps extends rearwardly from the rear wall. The pumps include two forward pumps. The forward pumps extends forwardly from the front wall. Lines are provided. The lines couple the pumps with the tanks. A light is provided above the pumps.

Further provided is a communication assembly. The communication assembly includes a satellite communication dish. The satellite communication dish is provided on the roof. The communication assembly includes phones and card readers. The communication assembly couples the dish and the pumps for controlling and monitoring the dispensing of gasoline fuel and diesel fuel.

Provided last are supplemental controls. The supplemental controls include a generator, power supply, electrical panel and fire extinguisher. The generator, power supply, electrical panel and fire extinguisher are provided in the forward chamber. The supplemental controls further include a monitor gage and an emergency stop shut off. Also included in the supplemental controls is a transfer pump and audible-visual alarm. The transfer pump and audible-visual alarm are provided in the gasoline fuel tank. The supplemental controls also include emergency vents. The emergency vents are provided on the gasoline fuel tank. The monitor gage and emergency stop shut off are provided in the rearward chamber.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mobile emergency response fuel facility which has all of the advantages of the prior art fuel facilities of known designs and configurations and none of the disadvantages.

It is another object of the present invention to provide a new and improved mobile emergency response fuel facility which may be easily and efficiently manufactured and marketed.

It is further object of the present invention to provide a new and improved mobile emergency response fuel facility which is of durable and reliable constructions.

An even further object of the present invention is to provide a new and improved mobile emergency response fuel facility which is susceptible of a low cost of manufacture with regard to both materials and labor, and which accordingly is then susceptible of low prices of sale to the consuming public, thereby making such mobile emergency response fuel facility economically available to the buying public.

Even still another object of the present invention is to provide a mobile emergency response fuel facility for providing fuel to people and their vehicles in regions hit by hurricanes and other disasters.

Lastly, it is an object of the present invention to provide a new and improved mobile emergency response fuel facility. A planar support has an upper and lower surface, a front end and a rear end. The support has wheels. A housing mounted on the upper surface has a rear wall, front wall and side walls and a roof to define a space. A wall divides the space into a first chamber and a second chamber. A gasoline fuel tank and a diesel fuel tank is provided in the second chamber. A pump dispenses gasoline fuel and diesel fuel from the tanks.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
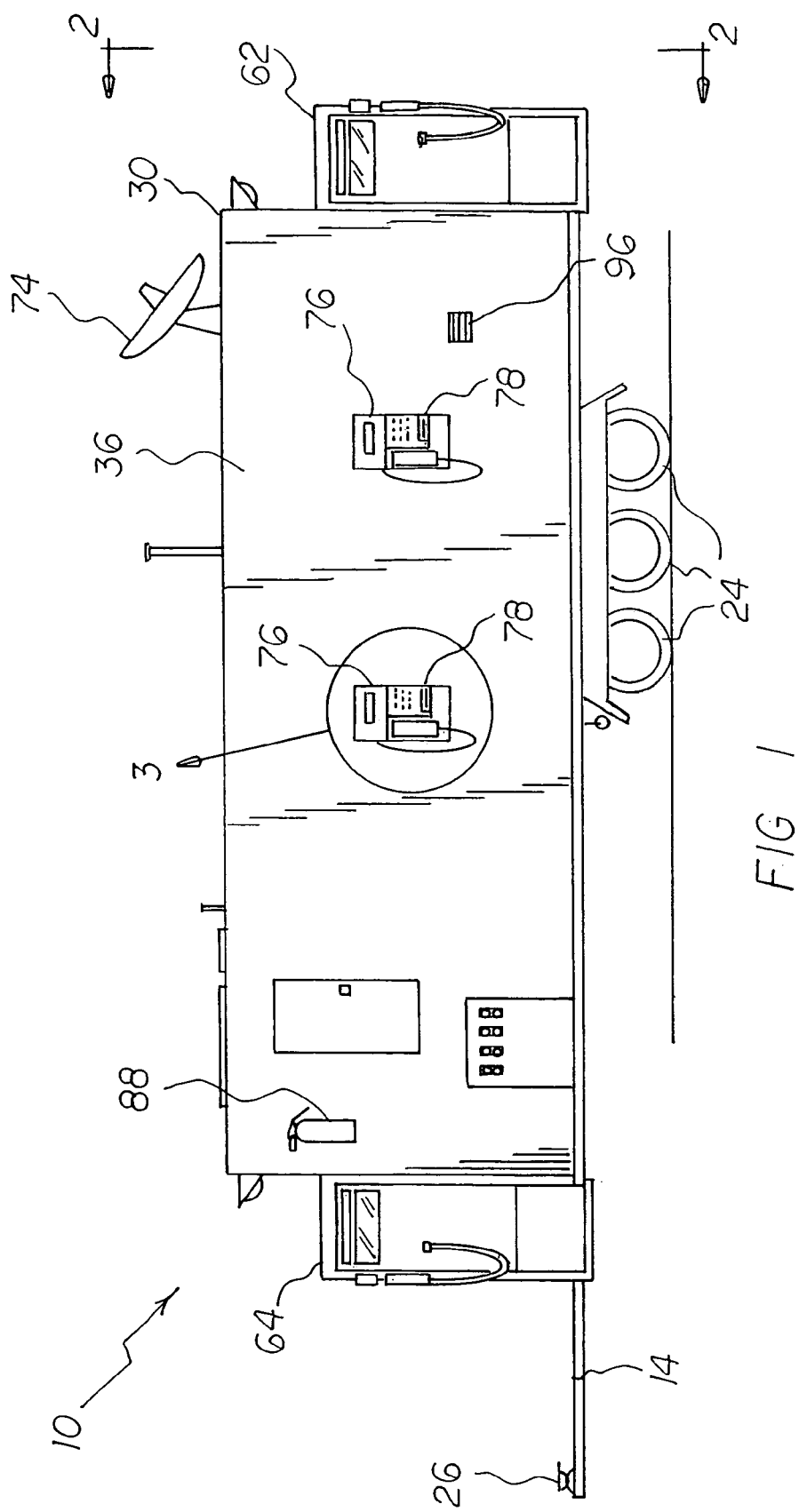
FIG. 1 is a side elevational view of a mobile emergency response fuel facility constructed in accordance with the principles of the present invention.
Figure 2:
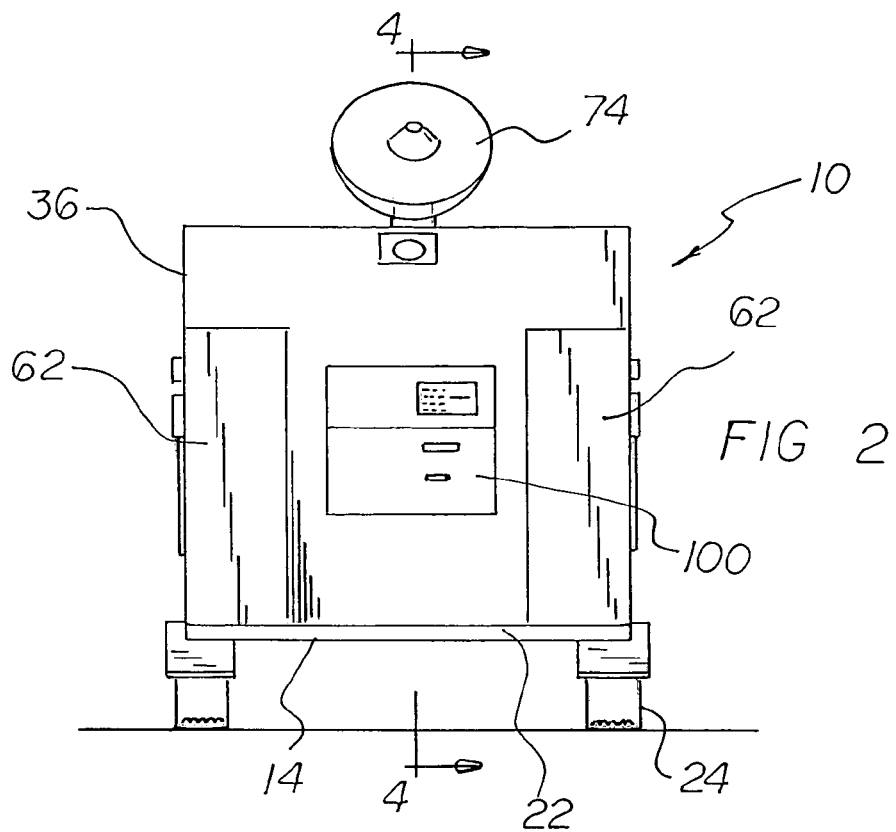
FIG. 2 is a rear elevational view of the facility taken at line 2-2 of FIG. 1.
Figure 3:
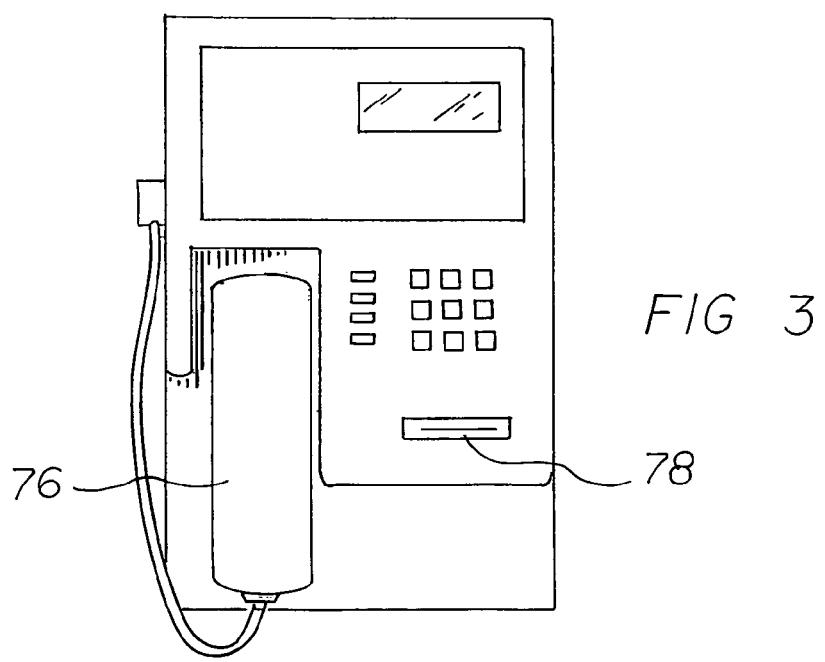
FIG. 3 is an enlarged elevational view of a portion of the system taken at circle 3 of FIG. 1.
Figure 4:
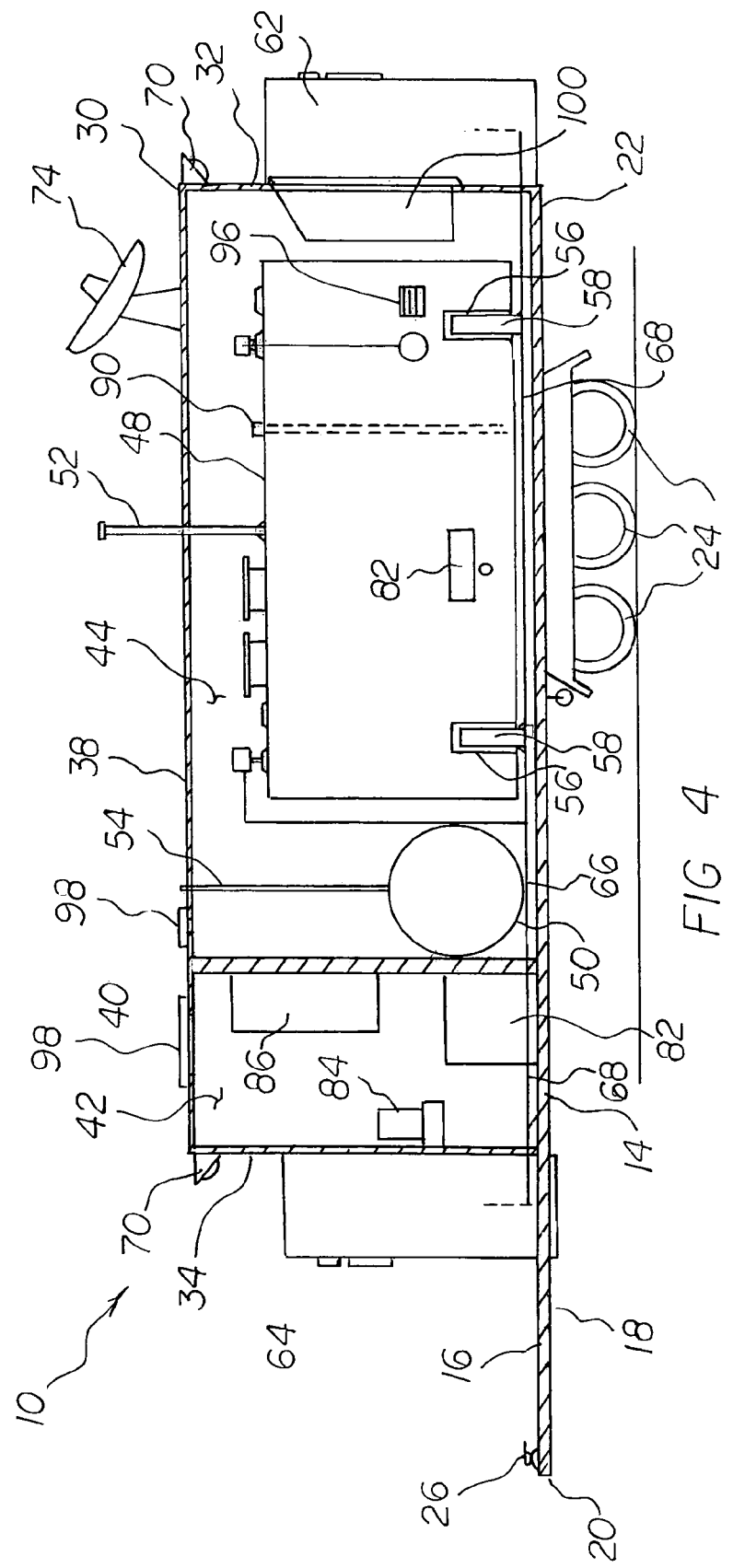
FIG. 4 is a cross sectional view of the facility taken along line 4-4 of FIG. 2.

With reference now to the drawings, and in particular to FIG. 1 thereof, the preferred embodiment of the new and improved mobile emergency response fuel facility embodying the principles and concepts of the present invention and generally designated by the reference numeral 10 will be described.

The present invention, the mobile emergency response fuel facility 10 is comprised of a plurality of components. Such components in their broadest context include a planar support, a housing, a wall, a fuel tank and a pump. Such components are individually configured and correlated with respect to each other so as to attain the desired objective.

First provided is a planar support 14. The support has an upper surface 16 and a lower surface 18. The support has a front end 20 and a rear end 22. The support has a plurality of wheels 24. The wheels depend from the lower surface adjacent to the rear end. The wheels have an attachment component 26. The attachment component is adjacent to the front end. In this manner the wheels may be separably coupled to a towing vehicle for transportation purposes.

A rectilinear housing 30 is provided. The housing is mounted on the upper surface of the planar support. The housing has a vertical rear wall 32. The rear wall overlies the rear end. The housing has a vertical front wall 34. The front wall is in proximity to the front end. The housing has vertical side walls 36. The side walls are provided between the front and rear walls. The housing has a horizontal roof 38. The roof overlies the front and rear and side walls. In this manner a space is defined there beneath.

Provided next is a vertical intermediate wall 40. The intermediate wall is parallel with the front and rear walls. In this manner the space is divided into a smaller forward chamber 42 for controller components and a larger rearward chamber 44 for the storage of fuel to be dispensed.

A rectilineal gasoline fuel tank 48 is provided. The gasoline fuel tank is provided in the rearward chamber for gasoline. A cylindrical tank 50 is provided for diesel fuel. A gasoline vent 52 is provided. The gasoline vent extends upwardly from the gasoline fuel tank through the roof and vents to atmosphere. A diesel fuel vent 54 is provided. The diesel vent extends upwardly from the gasoline fuel tank through the roof and vents to atmosphere. Recesses 56 are provided in the gasoline fuel tank. Positioning blocks 58 are provided. The blocks extend upwardly from the upper surface into the recesses. In this manner undesired movement of the gasoline fuel tank during transportation is precluded.

Provided next is a plurality of pumps 62, 64. The pumps include two rearward pumps 62. The rearward pumps extends rearwardly from the rear wall. The pumps include two forward pumps 64. The forward pumps extends forwardly from the front wall. Lines 66, 68 are provided. The lines couple the pumps with the tanks. A light 70 is provided above the pumps.

Further provided is a communication assembly. The communication assembly includes a satellite communication dish 74. The satellite communication dish is provided on the roof. The communication assembly includes phones 76 and card readers 78. The communication assembly couples the dish and the pumps for controlling and monitoring the dispensing of gasoline and diesel fuel.

Provided last are supplemental controls. The supplemental controls include a generator 82 which supplies power to the power supply 84 and the electrical panel 86. The supplemental controls also includes a fire extinguisher 88. The generator, power supply, electrical panel and fire extinguisher are provided in the forward chamber. The supplemental controls further include a monitor gage 90 and an emergency stop shut off 92. Also included in the supplemental controls is a transfer pump 94 and audible-visual alarm 96. The transfer pump and audible-visual alarm are provided in the gasoline fuel tank. The supplemental controls also include emergency vents 98. The emergency vents are provided on the gasoline fuel tank. The monitor gage and emergency stop shut off are provided in the rearward chamber as well as an ATM machine 100 in the rear.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mobile emergency response fuel facility comprising:
   a planar support having an upper and lower surface with a front end and a rear end, the support having wheels;
   a housing mounted on the upper surface with a rear wall and front wall with side walls and a roof to define a space, the housing having a first forward chamber and a second rearward chamber, wherein a fuel tank is contained within the second chamber;
   a vertical wall dividing the housing space into the first forward chamber and the second rearward chamber, the vertical wall being parallel to the front wall and rear wall;
   a gasoline fuel tank and a diesel fuel tank in the second chamber, each of the fuel tanks having a tank wall recesses with each recess having an associated block to prevent movement of the tank while the facility is being moved;
   a generator for supplying power to the power supply box and electrical panel; and
   a pump for dispensing gasoline and diesel fuel from the tanks.

2. The system as set forth in claim 1 and further including a gasoline vent extending upwardly from the gasoline fuel tank through the roof and venting to atmosphere and a diesel fuel vent extending upwardly from the gasoline fuel tank through the roof and venting to atmosphere.

3. The system as set forth in claim 1 and further including recesses in the gasoline fuel tank with positioning blocks extending upwardly from the upper surface into the recesses to preclude undesired movement of the gasoline fuel tank during transportation.

4. The system as set forth in claim 1 wherein the pump includes a rearward pump extending rearwardly from the rear wall and a forward pump extending forwardly from the front wall with lines coupling the pumps and the tanks.

5. The system as set forth in claim 1 and further including a communication assembly comprising a satellite communication dish on the roof with phones and card readers coupling the dish and the pumps for controlling and monitoring the dispensing of gasoline and diesel fuel.

6. The system as set forth in claim 1 and further including supplemental controls comprising, in the first chamber, a generator, power supply, electrical panel and fire extinguisher, and, in a rearward chamber, a monitor gage and emergency stop shut off, transfer pump and audible-visual alarm in the gasoline fuel tank and emergency vents on the gasoline fuel tank.

7. A mobile emergency response fuel facility for providing fuel to people and their vehicles in regions hit by hurricanes and other disasters comprising, in combination:
   a planar support having an upper surface and a lower surface with a front end and a rear end, the support having a plurality of wheels depending from the lower surface adjacent to the rear end with an attachment component adjacent to the front end for separable coupling to a towing vehicle for transportation purposes;
   a rectilinear housing mounted on the upper surface of the planar support with a vertical rear wall overlying the rear end and a vertical front wall in proximity to the front end with vertical side walls between the front and rear walls and a horizontal roof overlying the front and rear and side walls to define a space there beneath;
   a vertical intermediate wall parallel with the front and rear walls dividing the space into a smaller forward chamber for controller components and a larger rearward chamber for the storage of fuel to be dispensed;
   a rectilineal gasoline fuel tank in the rearward chamber for gasoline and a cylindrical tank for diesel fuel with a gasoline vent extending upwardly from the gasoline fuel tank through the roof and venting to atmosphere and a diesel fuel vent extending upwardly from the gasoline fuel tank through the roof and venting to atmosphere, recesses in the gasoline fuel tank with positioning blocks extending upwardly from the upper surface into the recesses in the fuel tanks to preclude undesired movement of the gasoline fuel tank during transportation;
   a plurality of pumps including two rearward pumps extending rearwardly from the rear wall and two forward pumps extending forwardly from the front wall with lines coupling the pumps with the tanks and lights above the pumps;
   a communication assembly including a satellite communication dish on the roof with phones and card readers coupling the dish and the pumps for controlling and monitoring the dispensing of gasoline and diesel fuel; and
   supplemental controls including, in the forward chamber, a generator, power supply, electrical panel and fire extinguisher, and, in the rearward chamber, a monitor gage, ATM machine and emergency stop shut off, transfer pump and audible-visual alarm in the gasoline fuel tank and emergency vents on the gasoline fuel tank.

\* \* \* \* \*